United States Patent
Kim (10) Patent No.: US 9,613,280 B2
(45) Date of Patent: Apr. 4, 2017

(54) SYSTEM AND METHOD FOR FRONT DETECTING OF VEHICLE

(71) Applicant: HYUNDAI MOBIS Co., Ltd., Yongin-si, Gyeonggi-do (KR)

(72) Inventor: Young Shin Kim, Yongin-si (KR)

(73) Assignee: HYUNDAI MOBIS CO., LTD., Gyeonggi-do, Yongin-si (KR)

( * ) Notice: Subject to any disclaimer, the term of this patent is extended or adjusted under 35 U.S.C. 154(b) by 221 days.

(21) Appl. No.: 14/552,565

(22) Filed: Nov. 25, 2014

(65) Prior Publication Data
US 2015/0199577 A1   Jul. 16, 2015

(30) Foreign Application Priority Data
Jan. 10, 2014   (KR) .................. 10-2014-0003200

(51) Int. Cl.
| | |
|---|---|
| G06K 9/00 | (2006.01) |
| G01S 17/02 | (2006.01) |
| G01S 17/89 | (2006.01) |
| G01S 17/93 | (2006.01) |
| G01S 7/497 | (2006.01) |
| G06T 7/64 | (2017.01) |
| B60R 1/00 | (2006.01) |

(52) U.S. Cl.
CPC ........ *G06K 9/00798* (2013.01); *G01S 7/4972* (2013.01); *G01S 17/023* (2013.01); *G01S 17/89* (2013.01); *G01S 17/936* (2013.01); *G06K 9/00805* (2013.01); *G06T 7/64* (2017.01); *B60R 1/00* (2013.01); *G06T 2207/10016* (2013.01); *G06T 2207/10028* (2013.01); *G06T 2207/30256* (2013.01)

(58) Field of Classification Search
CPC ...... G01S 17/023; G01S 17/89; G01S 17/936; G01S 7/4972; G06K 9/00798; G06K 9/00805; G06T 2207/10016; G06T 2207/10028; G06T 2207/30256; G06T 7/604; B60R 1/00
USPC ........................................ 348/148
See application file for complete search history.

(56) References Cited

U.S. PATENT DOCUMENTS

| | | | | |
|---|---|---|---|---|
| 2008/0040039 | A1* | 2/2008 | Takagi | G01S 17/936 701/300 |
| 2008/0059037 | A1* | 3/2008 | Isaji | B60W 40/072 701/93 |

(Continued)

FOREIGN PATENT DOCUMENTS

| | | | |
|---|---|---|---|
| KR | 20120041583 A | * | 5/2012 |
| KR | 20130125644 A | * | 11/2013 |

*Primary Examiner* — Behrooz Senfi
(74) *Attorney, Agent, or Firm* — Paratus Law Group, PLLC (57) ABSTRACT

The present invention provides automotive forward-looking system and method. According to an aspect of the present invention, there is provided an automotive forward-looking system including: a forward-looking sensor that has a field of view in a predetermined range of angle and monitors a forward area of a vehicle; a controller that calculates a turning angle of the forward-looking sensor by estimating the curvature of a curved road; and a sensor turning unit that turns the forward-looking sensor by being controlled to operate by the controller, in which the controller estimates the curvature of a curved road on the basis of a guardrail installed at a side of the curved road.

12 Claims, 5 Drawing Sheets

(56) References Cited

U.S. PATENT DOCUMENTS

2012/0106786 A1* 5/2012 Shiraishi ............... G01S 13/867
                                                          382/103
2016/0207534 A1* 7/2016 Nishimura ............ B60W 50/14

* cited by examiner

FIG. 6

SYSTEM AND METHOD FOR FRONT DETECTING OF VEHICLE

CROSS-REFERENCE TO RELATED APPLICATION

This application claims the priority benefit of Korean Patent Application No. 10-2014-0003200, filed on Jan. 10, 2014 in the Korean Intellectual Property Office, the disclosure of which is incorporated herein by reference.

BACKGROUND OF THE INVENTION

1. Field of the Invention

The present invention relates to an automotive forward-looking system and a method thereof.

2. Description of the Related Art

Vehicles are recently equipped with various types of safety devices with an increase in demand for safety performance of vehicles. Vehicles are equipped with various safety devices, such as not only an airbag system or an ABS (Anti-Lock Brake System) that is one of the typical automotive safety devices, but an ESP (Electronic Stability Program), a TMPS (Tire Pressure Monitoring System), and a LDWS (Lane Departure Warning System). An AEB (Autonomous Emergency Braking) system, a kind of those automotive safety devices, has been proposed. The AEB system, which can prevent a vehicle that is running from colliding with other vehicles and pedestrians by determining whether it is a situation requiring emergency braking and by braking the vehicle in an emergency, is one of the automotive safety devices which is recently urged by Euro-NCAP (European New Car Assessment Program) etc.

The AEB system needs to keep monitoring or observing the area ahead of a vehicle while the vehicle runs, in order to determine whether there is an emergency or there is an obstacle ahead. However, in general, because forward-looking sensors have a predetermined range of FOV (Field Of View), it is difficult to keep an appropriate observation range following the running direction of vehicles on curved roads. That is, those forward-looking sensors having a predetermined FOV may have a problem in that they lose their objective vehicle, misrecognize an object by confusing it with another vehicle in the next lane, or trace a wrong object. Accordingly, the forward-looking sensors are controlled to turn at a predetermined angle to maintain an appropriate observation range on curved roads.

Figure 1:
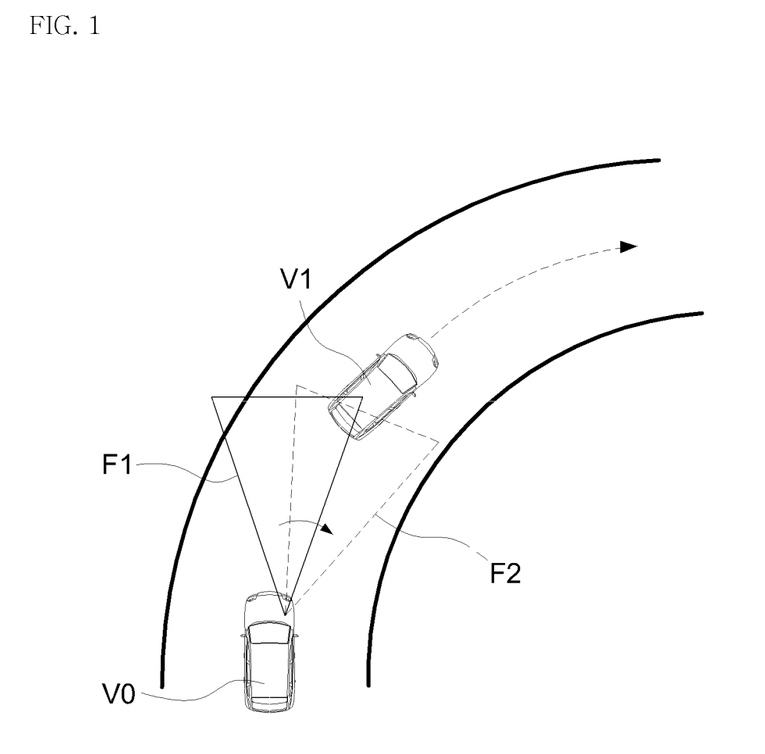
FIG. 1 is a schematic diagram showing control of turning a forward-looking sensor on a curved road.

FIG. 1 is a schematic diagram showing control of turning a forward-looking sensor on a curve. Referring to FIG. 1, while a vehicle V0 runs on a curved road, a forward-looking sensor is controlled to turn at a predetermined angle so that an appropriate observation range can be maintained in accordance with the running direction. For example, as shown in FIG. 1, when the vehicle V0 running with a first observation range F1 enters a curved road, the forward-looking sensor is turned clockwise at a predetermined angle to have a second observation range F2 in accordance with the curvature of the curved road, thereby preventing misrecognition by the forward-looking sensor.

The control of turning the forward-looking sensor is achieved by calculating the curvature of the curved road and turning the forward-looking sensor in consideration of the speed of the vehicle. The curvature of the curved road is calculated from information about the curved road or the race of a vehicle V1 ahead, but using this method is limited, depending on traveling environments. There is a technical limit in that the road information cannot be used when the road is unclear or it is night, and the trace of the vehicle V1 ahead cannot be used when there is no vehicle V1 ahead or the vehicle V1 ahead moves along a path different from the curved road.

SUMMARY OF THE INVENTION

Embodiments of the present invention provide automotive forward-looking system and method which can calculate information about the curvature of a curved road and control a forward-looking sensor to turn appropriately, even if it is impossible to use information about a road or the trace of a vehicle ahead.

According to an aspect of the present invention, there is provided an automotive forward-looking system including: a forward-looking sensor that has a field of view in a predetermined range of angle and monitors a forward area of a vehicle; a controller that calculates a turning angle of the forward-looking sensor by estimating the curvature of a curved road; and a sensor turning unit that turns the forward-looking sensor by being controlled to operate by the controller, in which the controller estimates the curvature of a curved road on the basis of a guardrail installed at a side of the curved road.

According to another aspect of the present invention, there is provided an automotive forward-looking method including: obtaining a YUV image and a depth image of a forward area of a vehicle through a camera and a LIDAR sensor; detecting a lane from the YUV image; detecting a track of a vehicle in the forward area from the YUV image and the depth image; detecting a guardrail from the depth image; calculating a first curvature based on the detected lane, a second curvature based on the detected track of the vehicle in the forward area, and a third curvature based on the detected guardrail; and estimating a resultant curvature of a curved road on the basis of the first to third curvatures.

The automotive forward-looking system and method according to embodiments of the present invention can more accurately estimate a curvature and control turning of a sensor under more various environments by detecting a guardrail other than a lane or the track of a vehicle in a forward area and then estimating the curvature of a curved road.

DETAILED DESCRIPTION OF THE PREFERRED EMBODIMENTS

Hereinafter, embodiments of the present invention will be described with reference to the accompanying drawings. However, it should be understood that the following embodiments are provided to help understand the present invention and the scope of the present invention is not limited to the following embodiments. Further, the following embodiments are provided to fully explain the present invention to those skilled in the art and well-known configurations that may make the spirit of the present invention unclear are not described in detail.

Figure 2:
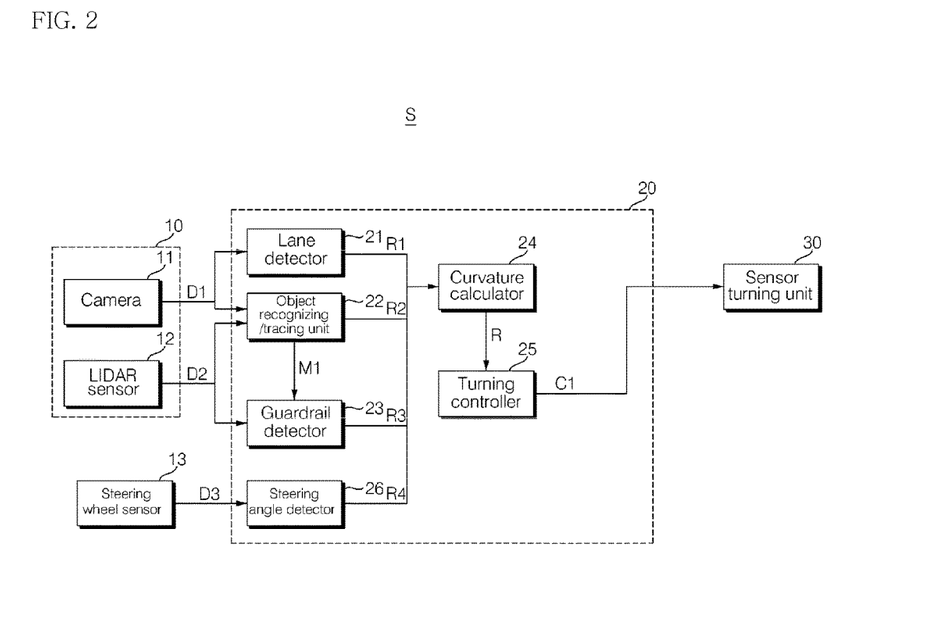
FIG. 2 is a diagram illustrating the configuration of an automotive forward-looking system according to an embodiment of the present invention.

FIG. 2 is a diagram illustrating the configuration of an automotive forward-looking system according to an embodiment of the present invention.

Referring to FIG. 2, an automotive forward-looking system (hereafter, referred to as 'forward-looking system S') according to the present embodiment may include a forward-looking sensor 10, a controller 20, and a sensor turning unit 30. In general, the forward-looking sensor 10 senses the forward area of a vehicle within a predetermined FOV (Field Of View) and the controller 20 can calculate the curvature of a curved road from information received from the forward-looking sensor 10. The sensor turning unit 30 can be controlled by the controller 20 and turns the forward-looking sensor 10 in accordance with the value of the calculated curvature.

Hereafter, the components are described in detail.

The forward-looking sensor 10 for observing the forward area of a vehicle may include a camera 11 and an LIDAR (Light Detection and Ranging) sensor 12. The camera 11 can create YUV images D1 of the forward area of a vehicle and send them to the controller 20. The YUV images D1 provided from the camera 11 may be used to detect lanes or recognize objects in the forward area through image processing. The LIDAR sensor 12 can produce depth images D2 of the forward area of a vehicle and send them to the controller 20. The depth images D2 provided from the LIDAR sensor 12 may be used to recognize and trace objects in the forward area and to detect guardrails.

The controller 20 can calculate the curvature of a curved road from information received from the forward-looking sensor 10 and control operation of the sensor turning unit 30.

In detail, the controller 20 may include a lane detector 21. The lane detector 21 can detect lanes from a YUV image DI received from the camera 11. The lane detection may be achieved by processing the YUV image D1. For example, the lane detector 21 can create a contour image from the YUV image D1 and detect lanes from the YUV image D1 in consideration of the shade features (generally, lanes are shown light) or geometric features (location and thickness etc.) of lanes. Further, the lane detector 21 can calculate first curvature R1 on the basis of the track of a detected lane and provide it to a curvature calculator 24.

The controller 20 may include an object recognizing/tracing unit 22. The object recognizing/tracing unit 22 can receive YUV images D1 from the camera 11 and depth images D2 from the LIDAR sensor 12. The object recognizing/tracing unit 22 can recognizes objects in the forward area (particularly, vehicles running in the forward area) from the YUV images D1 and the depth images D2 and calculate the tracks of the objects in the forward area by tracing them. Further, the object recognizing/tracing unit 22 can calculate a second curvature R2 of a curved road on the basis of a calculated track and provide it to the curvature calculator 24.

Calculating the first and second curvatures R1 and R2 by means of the lane detector 21 or the object recognizing/tracing unit 22 is to estimate the curvature of a curved road on the basis a lane or the track of a vehicle in the forward area and it may be achieved similar to curvature calculation methods of the related art.

The controller 20 may include a guardrail detector 23. The guardrail detector 23 can receive depth images D2 from the LIDAR sensor and the locations M1 of forward objects from the object recognizing/tracing unit 22. The guardrail detector 23 detects guardrails at sides etc. of a curved road from received depth images D2 and locations M1 of forward objects.

Figure 3:
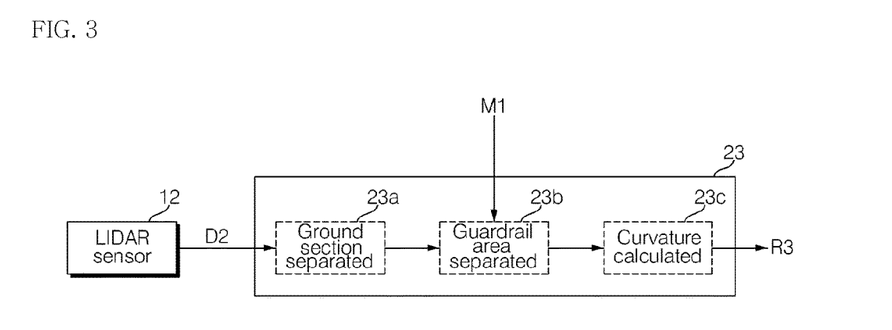
FIG. 3 is a detailed diagram of the guardrail detector shown in FIG. 2.

FIG. 3 is a detailed diagram of the guardrail detector shown in FIG. 2.

Referring to FIG. 3, the guardrail detector 23 separates a ground section (23a) and extracts a guardrail section (23b) from a depth image D2 provided from the LIDAR sensor 12. Further, the guardrail detector 23 calculates a third curvature R3 of guardrail by fitting a 3D-curve or curved surface for the detection point of the extracted guardrail section. The third curvature R3, similar to the first and second curvatures R1 and R2, can be provided to the curvature calculator 24 and is used to estimate the curvature of the curved road.

Figure 4:
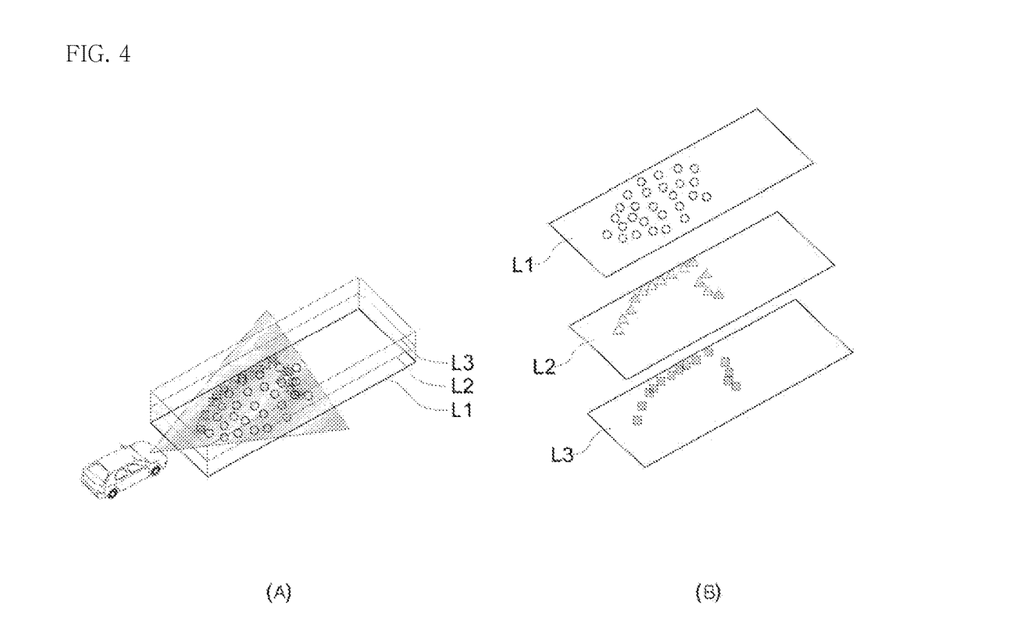
FIGS. 4 and 5 are exemplary diagrams showing a process of detecting a guardrail by the guardrail detector.
Figure 5:
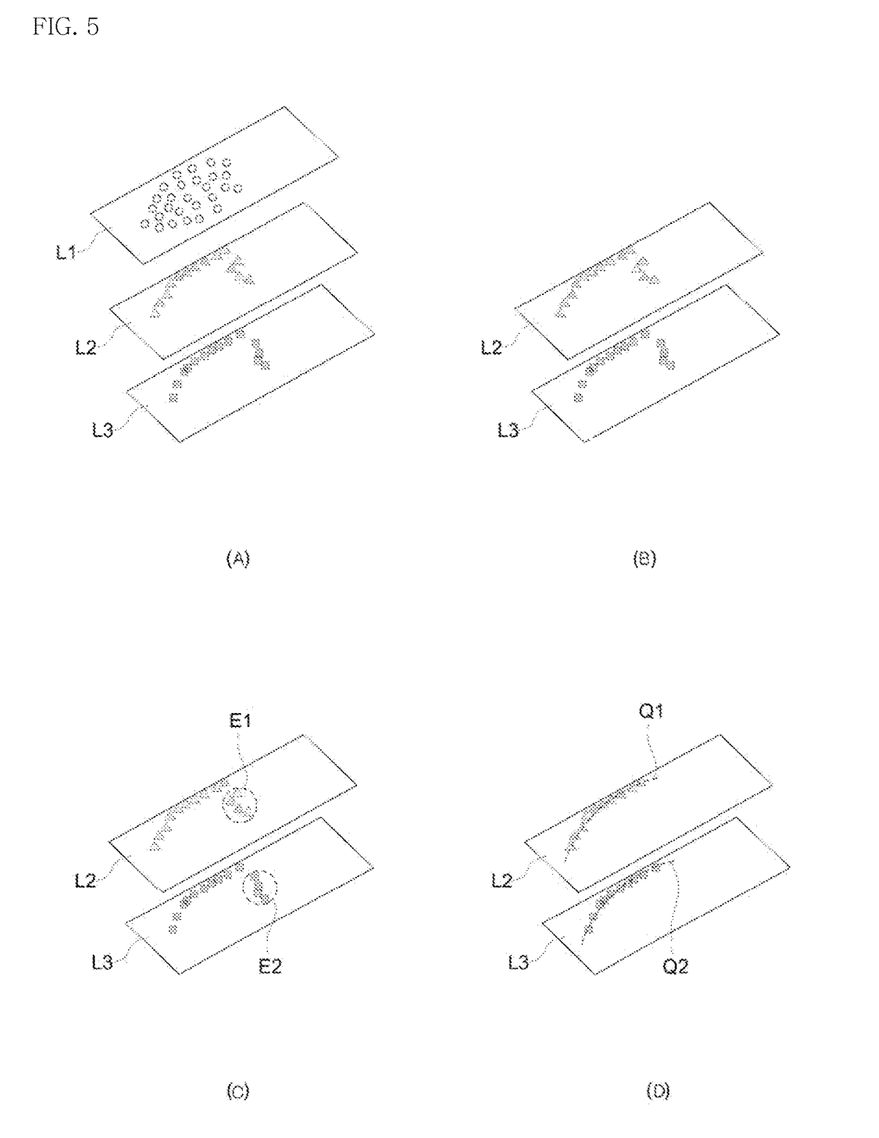

FIGS. 4 and 5 are exemplary diagrams showing a process of detecting a guardrail by the guard rail detector.

Referring to (a) of FIG. 4, a 3D-depth image or information can be obtained by the LIDAR sensor 12, as a result of 3D-projection by the LIDAR sensor 12. The depth image or information obtained by the LIDAR sensor 12 can be expressed as information saying distance values in a 3D-space. Further, as shown in (b) of FIG. 4, it is possible to obtain a plane by fitting a 3D-plane equation to the depth image or information obtained by the LIDAR sensor 12 and the plane can be divided for each of levels L1 to L3 and expressed by values for the levels L1 to L3.

Referring to (a) and (b) of FIG. 5, the guardrail detector 23 removes the ground section L1 from the information about the levels L1 to L3. Further, the guardrail detector 23 receives location information of objects in the forward area, and as shown in (c) of FIG. 5, it removes object areas E1 and E2 from the other sections L2 and L3. Further, as in (d) of FIG. 5, the guardrail detector 23 calculates the curvature of a guardrail by fitting 3D-curves Q1 and Q2 or curved surfaces to the depth information with the object areas E1 and E2 removed.

If necessary, a RANSAC (RANdom SAmple Consensus) algorithm may be used to remove an outlier etc. in the process described above.

Referring FIG. 2 again, the guardrail detector 23 can calculate the third curvature R3 of a guardrail at a side of a road through the process described above and the calculated third curvature R3 is provided to the curvature calculator 24.

The controller 20 may include the curvature calculator 24 receiving the first to third curvatures R1, R2, and R3 from the lane detector 21, the object recognizing/tracing unit 22, and the guardrail detector 23, respectively. The curvature calculator 24 can estimate the resultant curvature R of the curved road from the provided first to third curvatures R1, R2, and R3. For example, the curvature calculator 24 can estimate the resultant curvature R by correcting the average of the first to third curvatures R1, R2, and R3, using weight.

Alternatively, the curvature calculator 23 may estimate one of the first to third curvatures R1, R2, and R3 as the resultant curvature R, depending on the running environment of a vehicle. For example, when a vehicle is running at night, the curvature calculator 24 may estimate the second curvature R2 or the third curvature R3 as the resultant curvature R. Further, when there is no vehicle ahead of the vehicle, the curvature calculator 24 may estimate the first curvature R1 or the third curvature R3 as the resultant curvature R.

In particular, since the forward-looking system S according to the present embodiment calculates the resultant curvature R, using the third curvature R3 obtained by detecting a guardrail in addition to the first curvature R1 calculated on the basis of a lane and the second curvature R2 calculated on the basis of the track of a vehicle in the forward area, it has the advantage of being able to solve the technical problems of the related art. That is, it is possible to estimate the curvature of a curved road on the basis of a guardrail, even if a lane or the track of a vehicle in the forward area cannot be used in accordance with a running environment, such that the forward-looking system S can be appropriately used under more various environments.

Additionally, guardrails are generally installed at the sides of curved roads. Those guardrails are structures that are installed and fixed along curved roads and have curvatures corresponding to the curved roads, so they are easily detected more than lanes or the tracks of vehicles in the forward area. Further, the guardrails can be easily used, even if there is no vehicle in the forward area or it is difficult to detect a lane. The forward-looking system S according to the present embodiment can accurately estimate a curvature under more various environments, using a guardrail for estimating the curvature of a curved road, in consideration of this matter.

On the other hand, the controller 20 may include a turn controller 20 that controls operation of the sensor turning unit 30. The turn controller 20 can calculate a turning angle C1 of the sensor turning unit 30, using the resultant curvature R received from the curvature calculator 24. If necessary, the turn controller 20 can calculate the turning speed of the sensor turning unit 30 in consideration of the speed of a vehicle and the calculated turning angle C1 and turning speed are provided to the sensor turning unit 30, such that the sensor turning unit 30 is controlled to operate.

Further, the sensor turning unit 30 is connected to the forward-looking sensor 10, so it turns the forward-looking sensor 10 in accordance with the turning angle C1 provided from the turn controller 20. Accordingly, the forward-looking sensor 10 turns to maintain an appropriate observation range while a vehicle runs on a curved road (see FIG. 1). The sensor turning unit 30 may include a mechanical part such as a motor or an actuator to turn the forward-looking sensor 10, or it may include an optical part to turn the observation range of the forward-looking sensor 10.

If necessary, the controller 20 may further include a steering angle detector 26. The steering angle detector 26 can detect the steering angle of a vehicle on the basis of steering information D3 received from a steering wheel sensor 13. Further, the steering angle detector 26 can calculate a fourth curvature R4 on the basis of a detected steering angle and the fourth curvature R4, similar to the first to third curvatures R1 to R3, can be provided to the curvature calculator 24 for calculating the resultant curvature R of the curved road. In this case, the curvature calculator 24 can estimate the resultant curvature R of the curved road on the basis of the first to fourth curvatures R1 to R4.

As described above, the forward-looking system S according to the present embodiment can more accurately estimate a curvature and control turning of a sensor under more various environments by detecting a guardrail other than a lane or the track of a vehicle in the forward area and then estimating the curvature of a curved road. Further, such appropriate turning control allows for use of a sensor having a relatively narrow field of view. That is, it is possible to appropriately monitor or recognize a forward area even using a sensor having a narrow field of view, so it is possible to reduce the cost for implementing the system. For example, appropriate turning control of a sensor allows for implementing a system using a LIDAR sensor having a narrow field of view, such that it is possible to minimize an increase in installation cost accompanied by use of an expensive LIDAR sensor.

An automotive forward-looking method (hereafter, referred to as a 'forward-looking method) according to an embodiment of the present invention is described hereafter. However, the forward-looking method according to the present embodiment can be achieved by the forward-looking system S of the embodiment described above and the technical point is similar to that described above.

Figure 6:
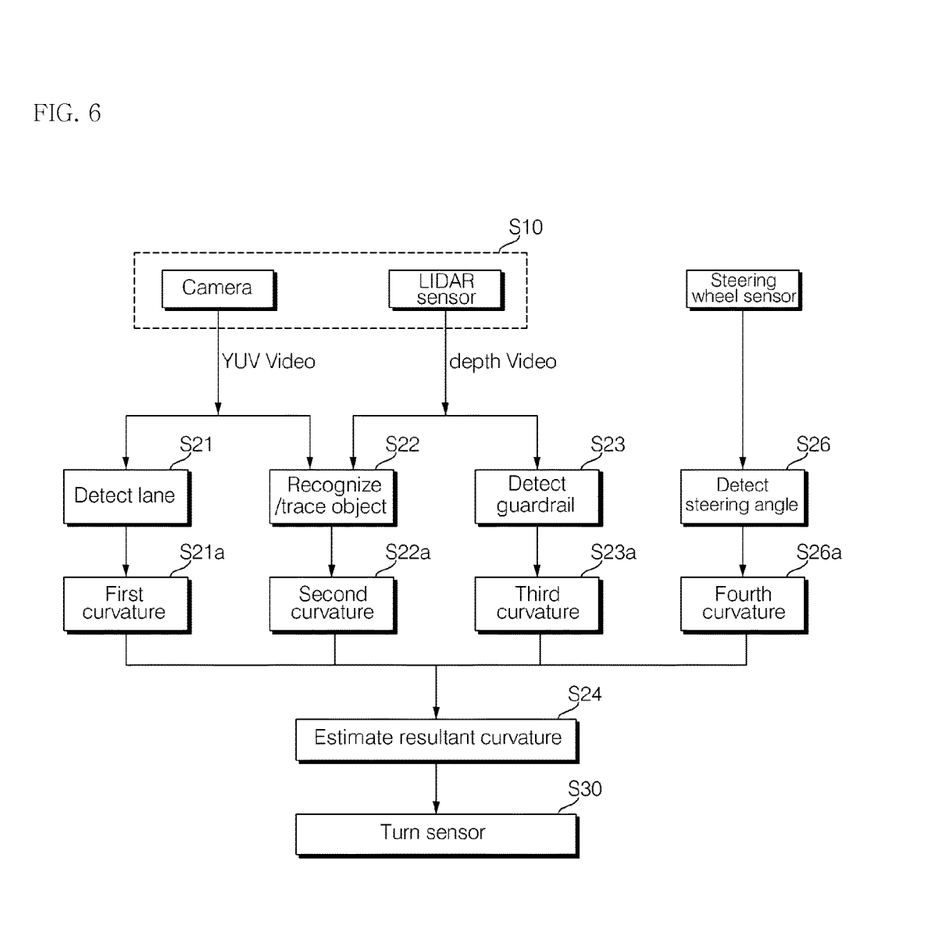
FIG. 6 is a flowchart illustrating an automotive forward-looking method according to an embodiment of the present invention.

FIG. 6 is a flowchart illustrating an automotive forward-looking method according to an embodiment of the present invention.

Referring to FIG. 6, the forward-looking method according to the present embodiment may include obtaining a YUV image and depth image data for the forward area of a vehicle through a camera or a LIDAR sensor (S10). That obtaining of data (S10) can be achieved by the forward-looking sensor 10 of the embodiment described above.

Further, the forward-looking method according to the present embodiment may include detecting lanes from the YUV image (S21). In the detecting of a lane (S21), lanes are detected by image processing on the YUV image and it may be achieved by the lane detector 21 of the embodiment described above.

Further, the forward-looking method according to the present embodiment may include recognizing a vehicle in the forward area and tracing the track of the vehicle from the YUV image obtained by the camera or the depth image data from the LIDAR sensor (S22). This process can be achieved by the object recognizing/tracking unit 22 of the embodiment described above.

Further, the forward-looking method according to the present embodiment may include detecting guardrails installed at the sides of a road from the depth image of the LIDAR sensor (S23). In the detecting of guardrails (S23), 3D-curves or curved surfaces following guardrails are extracted by removing a ground section or forward objects from the depth image data. This process may be achieved by the guardrail detector 23 of the embodiment described above.

Further, if necessary, the forward-looking method according to the present embodiment may further include detecting a steering angle of a vehicle through a steering wheel sensor (S26). This process may be achieved by the steering angle detector 26 of the embodiment described above.

Further, the forward-looking method according to the present embodiment may include calculating at least one of a first curvature based on a lane, a second curvature based on the track of a vehicle in the forward area, a third curvature based on a guardrail, and a fourth curvature based on a steering angle (S21*a*, S22*a*, S23*a*, and S24*a*). In the calculating of curvatures (S21*a*, S22*a*, S23*a*, and S24*a*), the first curvature is calculated on the basis of a lane detected in the detecting of lanes (S21) or the second curvature is calculated on the basis of the track of a vehicle in the forward area detected in the recognizing/tracking of a vehicle (S22). Further, in the calculating of curvatures (S21*a*, S22*a*, S23*a*, and S24*a*), the third curvature is calculated on the basis of a guardrail detected in the detecting of a guardrails (S23) or the fourth curvature is detected on the basis of a steering angle detected in the detecting of a steering angle (S26).

Further, the forward-looking method according to the present embodiment may include estimating a resultant curvature of a curved road on the basis of the first to fourth curvatures (S24). In the estimating of a resultant curvature (S24), one of the first to fourth curvatures is selectively taken in accordance with the running environment of a vehicle or the resultant curvature of the curved road is estimated through correction using the first to fourth curvatures. This process may be achieved by the curvature calculator 24 of the embodiment described above.

Further, the forward-looking method according to the present embodiment may include controlling turning of a forward-looking sensor by determining a turning angle of a camera or a forward-looking sensor such as a LIDAR sensor in accordance with the estimated resultant curvature and by controlling operation of a sensor turning unit (S30). In the turning of a forward-looking sensor (S30), turning can be controlled in accordance with the curvature of a curved road, so an appropriate observation range according to the running direction of a vehicle can be maintained. This process may be achieved by the turning controller 20 and the sensor turning unit 30 of the embodiment described above.

Although embodiments of the present invention were described above, those skilled in the art can change and modify the present invention in various ways by adding, changing, or removing components without departing from the spirit of the present invention described in claims and those changes and modifications are included in the scope of the present invention.

What is claimed is:

1. An automotive forward-looking system comprising:
   a forward-looking sensor that has a field of view in a predetermined range of angle and monitors a forward area of a vehicle;
   a controller that calculates a turning angle of the forward-looking sensor by estimating a curvature of a curved road, wherein the controller estimates the curvature of a curved road on the basis of a guardrail installed at a side of the curved road;
   a sensor turning unit that turns the forward-looking sensor by being controlled to operate by the controller; and
   a guardrail detector that calculates a first curvature on the basis of the guardrail,
   wherein the guardrail detector divides a depth image provided from the forward-looking sensor for each of heights and removes a ground section, removes an object area on a basis of location information of the vehicle in the forward area provided by an object recognizing/tracing unit, and calculates the first curvature by fitting a 3D-curve or curved surface on the depth image with the object area removed.

2. The system of claim 1, wherein the controller further includes:
   a lane detector that calculates a second curvature on the basis of a lane; and
   an object recognizing/tracing unit that calculates a third curvature on the basis of a track of a vehicle in a forward area.

3. The system of claim 2, wherein the controller further includes a steering angle detector that calculates a fourth curvature on the basis of a steering angle of a vehicle.

4. The system of claim 2, wherein the controller includes:
   a curvature calculator that estimates a resultant curvature of a curved road on the basis of the first to third curvatures; and
   a turning controller that calculates a turning angle of the forward-looking sensor in accordance with the estimated resultant curvature.

5. The system of claim 3, wherein the controller includes a curvature estimating unit that estimates the resultant curvature of a curved road on the basis of the first to fourth curvatures.

6. The system of claim 4, wherein the curvature calculator estimates one of the first to third curvatures as the resultant curvature in accordance with the running environment of a vehicle, in which the curvature calculator estimates the second curvature or the first curvature as the resultant curvature when there is no vehicle in the forward area, and the curvature calculator estimates the third curvature or the first curvature as the resultant curvature when a vehicle runs at night.

7. The system of claim 1, wherein the forward-looking sensor includes:
   a camera that provides a YUV image to the controller; and
   a LIDAR sensor that provides a depth image to the controller.

8. The system of claim 2, wherein the forward-looking sensor includes:
   a camera that provides a YUV image to the lane detector and the object recognizing/tracing unit; and
   a LIDAR sensor that provides a depth image to the object recognizing/tracing unit and the guardrail detector.

9. An automotive forward-looking method comprising:
   obtaining a YUV image and a depth image of a forward area of a vehicle through a camera and a LIDAR sensor;
   detecting a lane from the YUV image;
   detecting a track of a vehicle in the forward area from the YUV image and the depth image;
   detecting a guardrail from the depth image;
   calculating a first curvature based on the detected lane, a second curvature based on the detected track of the vehicle in the forward area, and a third curvature based on the detected guardrail; and
   estimating a resultant curvature of a curved road on the basis of the first to third curvatures,
   wherein the detecting of a guard rail further includes dividing a depth image provided from the LIDAR sensor for each of heights and removing a ground section,
   wherein the detecting of a guardrail further includes removing an object area on the basis of location information of the vehicle in the forward area detected in the detecting of a track of a vehicle in a forward area, and detecting a guardrail by fitting a 3D-curve or curved surface to the depth image with the object area removed.

10. The method of claim 9, further comprising determining a turning angle of the camera or the LIDAR sensor in accordance with the estimated resultant curvature and turning the camera or the LIDAR sensor.

11. The method of claim 9, further comprising detecting a steering angle of a vehicle together with the detecting of a lane, the detecting of a track of a vehicle in a forward area, and the detecting of a guardrail,
   wherein the calculating of a curvature calculates a fourth curvature on the basis of the detected steering angle, and
   the estimating of a curvature estimates the resultant curvature of a curved road on the basis of the first to fourth curvatures.

12. The method of claim 9, wherein the estimating of a curvature estimates one of the first to third curvatures as the resultant curvature in accordance with the running environment of a vehicle, in which the estimating of a curvature estimates the first curvature or the third curvature as the resultant curvature when there is no vehicle in the forward area, and the estimating of a curvature estimates the second curvature or the third curvature as the resultant curvature when a vehicle runs at night.

* * * * *